H. F. STRATTON.
SYSTEM OF MOTOR CONTROL.
APPLICATION FILED OCT. 1, 1908.
922,540.
Patented May 25, 1909.
2 SHEETS—SHEET 2.
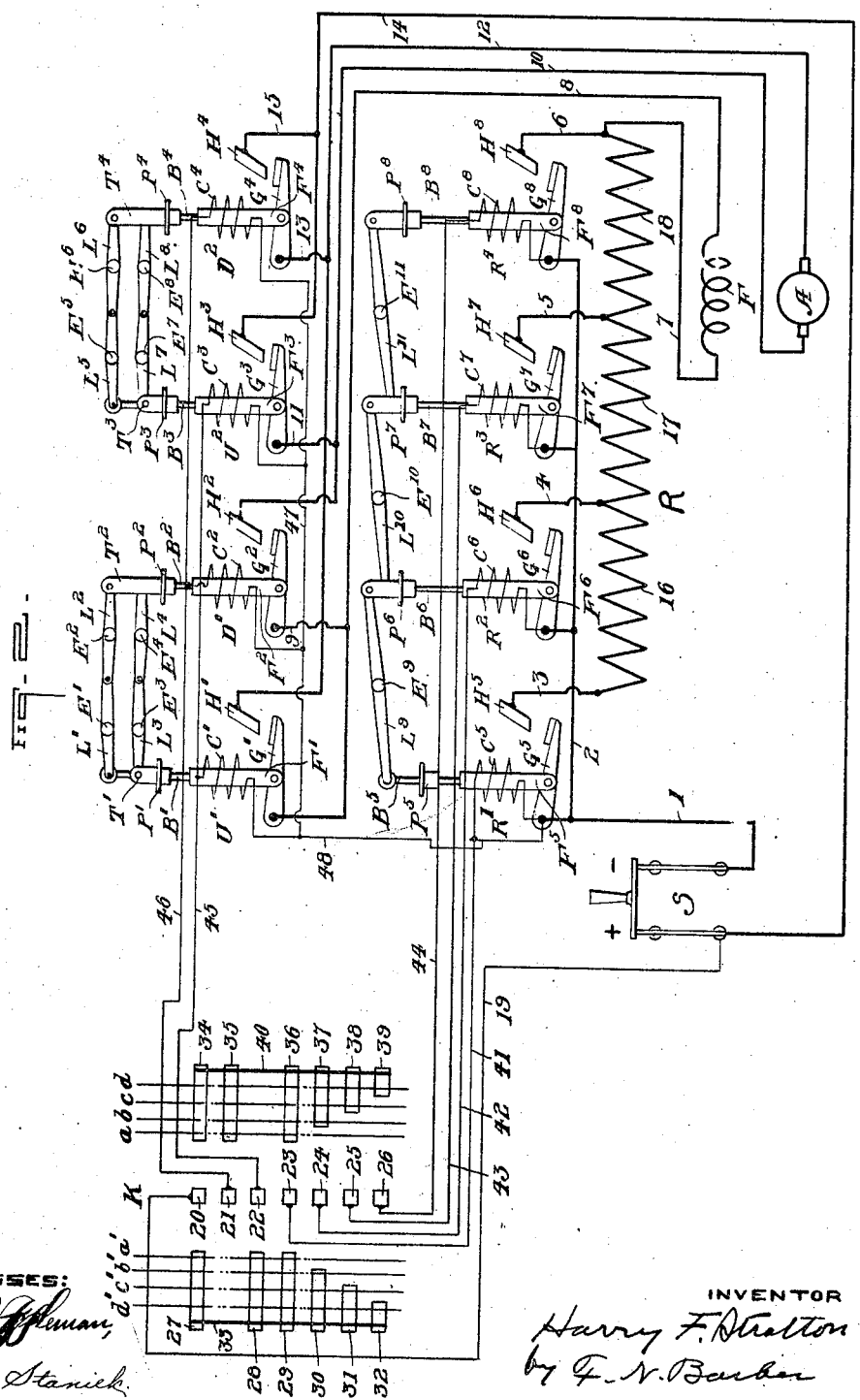
WITNESSES:
INVENTOR
Harry F. Stratton
by F. N. Barber
ATTORNEY

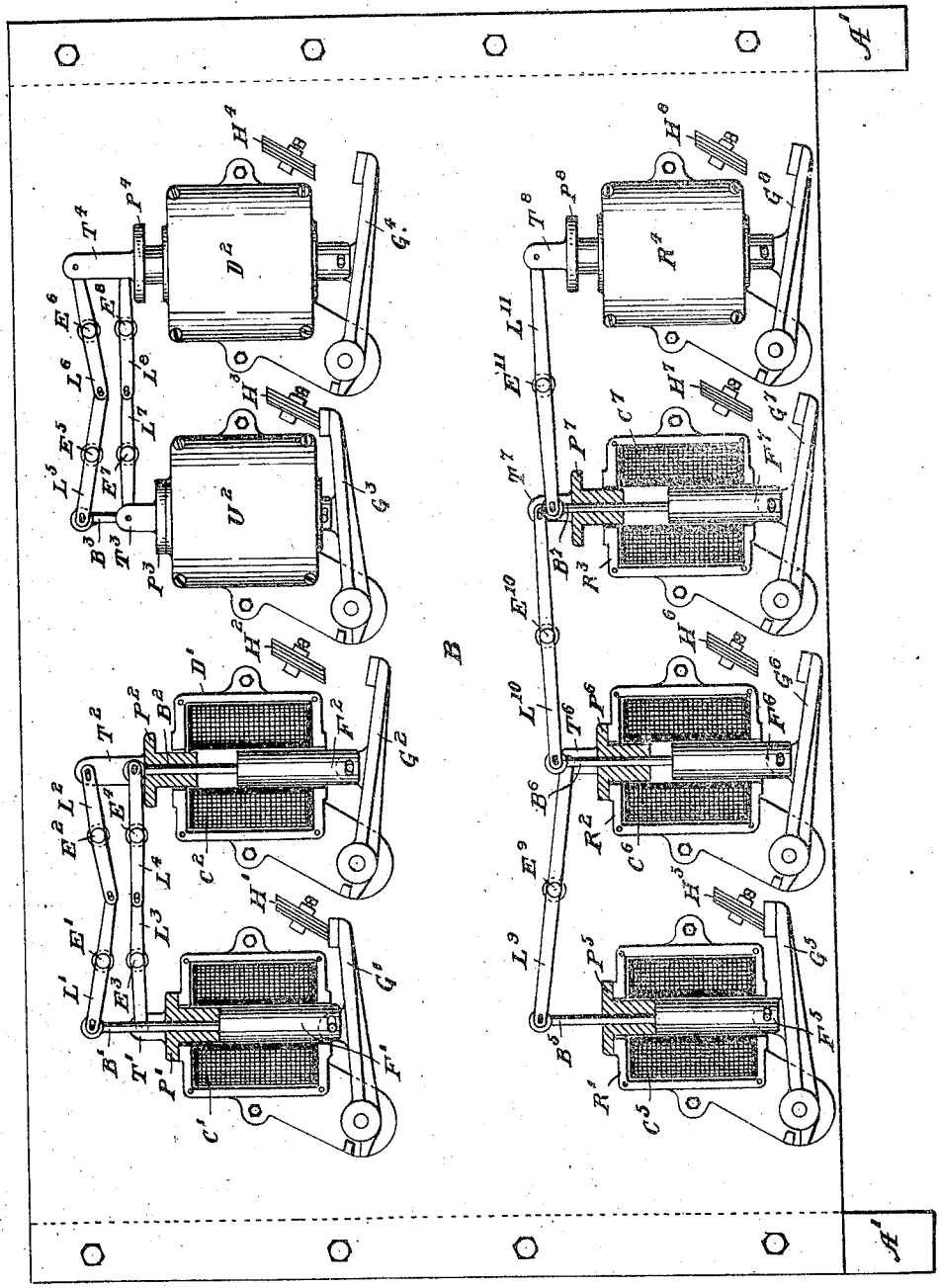

UNITED STATES PATENT OFFICE.

HARRY F. STRATTON, OF CLEVELAND, OHIO, ASSIGNOR TO THE ELECTRIC CONTROLLER AND MANUFACTURING COMPANY, OF CLEVELAND, OHIO, A CORPORATION OF OHIO.

SYSTEM OF MOTOR CONTROL.

No. 922,540.  Specification of Letters Patent.  Patented May 25, 1909.

Application filed October 1, 1908. Serial No. 455,623.

*To all whom it may concern:*

Be it known that I, HARRY F. STRATTON, a citizen of the United States, residing at Cleveland, in the county of Cuyahoga and State of Ohio, have invented or discovered certain new and useful Improvements in Systems of Motor Control, of which the following is a specification.

My invention relates to controllers of the type designated as magnetic switch controllers, wherein the various circuit changes necessary for the proper control of the motor are accomplished by the opening and closing of magnetically operated switches.

More specifically, my invention relates to a novel and valuable method of insuring that the magnetically operated switches shall always open or close in the right sequence.

The object of my invention is to provide a controller of such design that the closure of any one of the magnetic switches may, because of a temporary large air gap in its magnetic circuit, be impossible until the closure of a magnetic switch which the proper operation of the controller demands should close previously; that the closure of any one of the magnetic switches may, because of a temporary large air gap in its magnetic circuit be impossible until the opening of a magnetic switch which the proper operation of the controller demands should open previously; that the preventive air gap of any one of the magnetic switches may be reduced sufficiently to allow the closure of said switch, by the closure of a magnetic switch which the proper operation of the controller demands should close previously; that the preventive air gap of any one of the magnetic switches may be reduced sufficiently to allow the closure of said switch by the opening of a magnetic switch which the proper operation of controller demands should open previously; that the various auxiliary switches usually carried and operated by the magnetic switches to insure the proper sequence of closing and opening of said magnetic switches may be eliminated, thereby doing away with the troubles arising from the arcing, burning, wearing, sticking and failure of said auxiliary switches to make contact; that the complicated and extensive system of small control wires demanded by the use of electrical interlocks may be reduced to a very simple system of control wiring, thereby greatly lessening the chances of failure of control wiring; and in case of occurrence of such failure, making it much easier to locate promptly the source of trouble.

In the accompanying drawings, Figure 1 shows partly in front elevation and partly in vertical section a set of reversing and accelerating switches constructed in accordance with my invention, and Fig. 2 shows the circuit connections of a motor system embodying one form of my invention.

Referring to Fig. 1, two posts $A^1$ carry a slate B supporting eight magnetically operated switches, $U^1$, $D^1$, $U^2$, $D^2$, $R^1$, $R^2$, $R^3$, and $R^4$, the switches $U^1$, $D^1$, $R^1$, $R^2$ and $R^3$ being shown in vertical section. In the switch $U^1$, $C^1$ is the actuating coil and $F^1$ is the plunger, connected at its lower end to the contact arm $G^1$ and carrying at its upper end the brass rod $B^1$. $H^1$ is a laminated stationary brush, with which the contact arm $G^1$ makes contact when the plunger $F^1$ is in its upper position. $P^1$ is an iron or steel plug, sleeved on the rod $B^1$ and free to slide in the tube, on which the coil $C^1$ is wound and in which the plunger $F^1$ slides, and to slide on the rod $B^1$. The coil $C^1$ is inclosed in an iron shell which forms part of the magnetic circuit of said coil. When the plunger $F^1$ is in its highest position and the plug $P^1$ is in its lowest position, the magnetic circuit is practically complete, since the plunger and the plug preferably engage each other; but at all other positions of either the plug $P^1$ or the plunger $F^1$ there will be an air gap between the plug and the plunger. The strength of the solenoid $C^1$ is so designed with relation to the weight of the plunger $F^1$ and the contact arm $G^1$ to be lifted, that with the plug $P^1$ and the plunger $F^1$ in their lowest positions the pull of the solenoid on the plunger will be sufficient to raise the plunger and contact arm when the coil $C^1$ is excited; but with the plug $P^1$ in its highest position and the plunger $F^1$ in its lowest position, the air gap will be so large that the pull of the solenoid on the plunger will not be sufficient to raise the plunger and the contact arm when the coil $C^1$ is excited. The same description is applicable to all of the magnetic switches shown in Fig. 1.

The switches $U^1$, $D^1$, $U^2$, and $D^2$ are reversing switches. When the switches $U^1$ and $U^2$ are closed and the switches $D^1$ and $D^2$ are opened, the motor has such circuit connections that one direction rotation is obtained; but when the switches $D^1$ and $D^2$ are closed and the switches $U^1$ and $U^2$ are opened, the motor has such circuit connections that a contrary direction of rotation is obtained. It is, therefore, essential that when the switches $U^1$ and $U^2$ are closed, the switches $D^1$ and $D^2$ should be open and vice versa, and also that the switches $U^1$ and $U^2$ should not close until the switches $D^1$ and $D^2$ have opened and vice versa.

The first class levers $L^1$ and $L^2$ are mounted respectively upon pins $E^1$ and $E^2$ and have their ends pivotally connected. The remaining end of the lever $L^1$ is pivotally connected to rod $B^1$ and the remaining end of the lever $L^2$ is pivotally connected to the ears $T^2$ extending up from the plug $P^2$. The levers $L^3$ and $L^4$ are pivotally supported on the pins $E^3$ and $E^4$ and have the ends between the pins pivotally connected, the remaining end of the lever $L^3$ being pivotally connected to the ears $T^1$ extending up from the plug $P^1$; and the remaining end of the lever $E^4$ is pivotally connected to the brass rod $B^2$, which is carried by the upper end of the plunger $F^2$ and which is slidable within the plug $P^2$. The switch arm $G^2$ is pivotally connected to the lower end of the plunger $F^2$ and engages in its upper position the brush contact $H^2$. By the described connection of the plugs, plungers, levers and switch arms, it is seen that when the arm $G^1$ is closed, and plug $P^2$ will be in its highest position, so that it will be impossible by reason of the preventive air gap between the plug and the plunger for the switch arm $G^2$ to close. When, however, the switch arm $G^1$ has fully opened, the plug $P^2$ will be in its lowest position, and the switch arm $G^2$ will close when the coil $C^2$ is excited.

The switches $U^2$ and $D^2$ are constructed and interconnected in the same manner as the switches $U^1$ and $D^1$, the reference letters being the same in both sets of switches, but the exponents of the plugs, the brass rods, the switch arms and brushes are increased by two, and of the levers and pins by four.

The switches $R^1$, $R^2$, $R^3$ and $R^4$ are accelerating switches designed to cut out, step by step, sections of the starting resistance. These switches are constructed the same as the switch $U^1$ and its parts bear the same reference letters with the exponents increased by four, five, six, and seven for the switches $R^1$, $R^2$, $R^3$, and $R^4$, respectively. In the case of the accelerating switches, the proper operation of the controller demands that they should close in the following order: $R^1$, $R^2$, $R^3$, and $R^4$. The connection between the switches $R^1$ and $R^2$ is typical of the connections between the switches $R^2$ and $R^3$, and the switches $R^3$ and $R^4$.

The first class lever $L^9$ carried by the pivot pin $E^9$ is pivotally connected at its ends to the rod $B^5$ and the plug $P^6$. The first class lever $L^{10}$ pivoted on the pin $E^{10}$ has one end connected to the brass rod $B^6$ connected to the plunger $F^6$, and the remaining end connected to the plug $P^7$ of the switch $R^3$. The first class lever $L^{11}$ pivoted on pin $E^{11}$ has its opposite ends connected to the rod $B^7$ of the switch $R^3$ and the plug $P^8$ of the switch $R^4$. The plug $P^5$ of the switch $R^1$ is stationary.

The switch $R^1$ is shown closed, which closes the magnetic circuit through the plug $P^5$ and the plunger $F^5$. The lever $L^9$ has moved the plug $P^6$ to its lowest position so that the air gap between the plug and the plunger $F^6$ has become so reduced that, when the coil $C^6$ is energized, the switch $R^2$ will close. So long as the switch $R^2$ is open, the lever $L^{10}$ will keep the plug $P^7$ at its highest position, making the air gap in the coil $R^3$ too long to permit the switch $R^3$ to close, even if the coil $C$ be energized. Similarly, the switch $R^4$ cannot close so long as the switch $R^3$ is open. When the switch $R^1$ is open, the air gaps in the switches $R^2$, $R^3$, and $R^4$ are too great to permit them to close, but the plug $P^5$ is always in position to render the magnetic flux between it and the plunger $F^5$ effective to lift the plunger $P^5$ when the coil $C^5$ is energized. Thus when the switches $R^1$ to $R^4$ are all open, the switch $R^1$ is necessarily the first one to close. The remaining switches $R^2$, $R^3$, and $R^4$ must close in the definite order described.

Referring now to Fig. 2, which is wholly diagrammatic, I show the master controller K having the contact fingers 20 to 26 coöperative on one side with the contacts 27 to 32 connected by the conductor 33, and on the other side with the contacts 34 to 39, connected by the conductor 40. The finger 20 is connected by the wire 19 to positive pole of the switch S; the finger 21, by the wire 46 to the upper ends of the coils $C^2$ and $C^4$; the finger 22, by the wire 45, to the upper ends of the coils $C^1$ and $C^3$; the fingers 23 to 26, by the wires 44, 43, 42, and 41 to the upper ends of the coils $C^5$ to $C^8$, respectively. The switch arms $G^1$ and $G^2$ are connected to the wire 8 leading to one end of the field coil F of the motor; the switch arm $G^3$ is connected to the brush $H^2$ and to the wire 10 leading to one end of the armature A of the motor; the switch arm $G^4$ is connected to the brush $H^1$ and to the wire 12 leading to the remaining end of the armature A. The switch arms $G^5$ to $G^8$ are connected by the wire 2 to the wire 1 leading to the negative pole of the switch S, and also connected to the remaining ends of the coils $C^5$ to $C^8$, respectively. The brushes $H^3$ and $H^4$ are connected by the wire 14 to the positive side of the switch S; and the brushes $H^5$ to $H^8$ are connected to the resistance R so as to divide it into the three sections 16, 17, and 18 by means of the wire 3, 4, 5 and 6. The remaining end of the field F is connected to the outer end of the section 18 of the resistance. The wire 48 connects the negative wire 1 with the lower end of the coil C¹ and through the wire 47, with the lower ends of the coils C², C³, and C⁴.

The operation is as follows: The master controller K being moved to position $a$, the current will flow from the positive side of the switch S through the wire 19, the finger 20, the contacts 34 and 35, the wire 46, the coils C² and C⁴, the wires 47 and 48, and the wire 1 to the negative side of the switch S. This circuit closes the switches D¹ and D². At the same time a branch circuit extends from the contact 35 through the finger 23, the wire 41 and the coil C⁵ to the wire 1, this branch circuit closing the switch R¹. The motor circuit is now established as follows: From the positive pole of the switch S through the wire 14, the wire 15, the brush H⁴, the switch arm G⁴, the wire 13, the wire 12, the armature A, the wire 10, the brush H², the switch arm G², the wires 9 and 8, the field coil F, the wire 7, the entire resistance R, the brush H⁵, the switch arm G⁵, and the wire 1, to the negative pole of the switch S. As the controller is moved to the positions $b$, $c$ and $d$, the fingers 24, 25 and 26 engage the contacts 37, 38 and 39 which energize the coils C⁶, C⁷, and C⁸ in succession, causing the switches R², R³, and R⁴ to successively close in the manner and for the reasons already explained. When the controller is moved to the positions $a^1$ to $d^1$ the circuits are the same as at the positions $a$ to $d$ except that the wire 46 and the coils C² and C⁴ are dead and the wire 45 carries the current from the finger 20 and contact 27 through the coils C¹ and C³ to the wires 47 and 48 which change in the circuits causes the motor circuit to pass from the wire 14 through the switch U², the wire 10, the armature A, the wire 12, and the switch U¹ to the wire 8, from which the current flows as previously described. As the current through the armature A is contrary to its former direction while that through the field F is the same, the direction of rotation of the armature is reversed.

The principles of the operation of the several magnetic switches has been fully explained and need not be repeated in considering Fig. 2.

I claim:—

1. In a magnetically operated switch, the combination of an actuating coil, a plunger operated by said actuating coil, a movable contact operated by said plunger, a coöperating contact with which said movable contact may make electrical connection, a magnetic circuit for the actuating coil, said magnetic circuit having an air gap sufficiently large to prevent the operation of the plunger upon excitation of the actuating coil, and means for reducing the preventive air gap sufficiently to allow the operation of the plunger upon excitation of the actuating coil.

2. In a magnetic switch controller, magnetically operated switches, some of the said switches having air gaps in their magnetic circuits sufficiently large to prevent the operation of the respective switches upon excitation of their actuating coils, and means whereby said preventive air gaps may be reduced sufficiently to allow the operation of said switches upon the excitation of their actuating coils by the closure of that switch, which the proper operation of the controller demands should close previously.

3. In a magnetic switch controller, magnetically operated switches, said switches having air gaps in their magnetic circuit sufficiently large to prevent the operation of the respective switches upon excitation of their actuating coils, and means whereby said preventive air gaps may be reduced sufficiently to allow the operation of said switches upon the excitation of their actuating coils by the opening of that switch, which the proper operation of the controller demands should open previously.

4. In an electric controller, a series of electro-magnetically operated switches, certain of said switches having air gaps in the magnetic circuits of their actuating electro-magnets, and means operated by the actuation of one switch for diminishing the air gap in the magnetic circuit of another switch, such that said first switch must always be actuated before said second switch can operate.

5. In an electric controller, two or more electro-magnetically operated switches, an adjustable air gap in the magnetic circuit of the actuating electro-magnet of one of said switches, the extent of said air gap being adjusted between limits by the operation of another of said switches.

Signed at Cleveland, Ohio, this 21st day of September, A. D. 1908.

HARRY F. STRATTON.

Witnesses:
  H. M. DIEMER,
  F. W. JESSOP.